United States Patent
Gasbarro

(10) Patent No.: US 7,204,748 B2
(45) Date of Patent: Apr. 17, 2007

(54) POULTRY BREAST PORTION SIZING APPARATUS

(75) Inventor: Geno N. Gasbarro, Columbus, OH (US)

(73) Assignee: Remington Holdings LLC, Columbus, OH (US)

( * ) Notice: Subject to any disclaimer, the term of this patent is extended or adjusted under 35 U.S.C. 154(b) by 0 days.

(21) Appl. No.: 11/255,370

(22) Filed: Oct. 21, 2005

(65) Prior Publication Data

US 2006/0105692 A1    May 18, 2006

Related U.S. Application Data

(60) Provisional application No. 60/623,604, filed on Oct. 29, 2004.

(51) Int. Cl.
*A22C 21/00* (2006.01)

(52) U.S. Cl. ..................................... 452/149

(58) Field of Classification Search ........... 83/176, 83/17, 19, 20, 21; 452/149–152, 155, 156, 452/165, 170, 127, 129
See application file for complete search history.

(56) References Cited

U.S. PATENT DOCUMENTS

| | | | |
|---|---|---|---|
| 2,902,091 A * | 9/1959 | Dahle | 83/18 |
| 3,186,271 A * | 6/1965 | Fritz | 83/874 |
| 3,542,105 A * | 11/1970 | Townsend | 452/127 |
| 3,733,397 A * | 5/1973 | Beasley | 424/9.453 |
| 4,222,152 A * | 9/1980 | Braeger | 452/127 |
| 4,561,150 A * | 12/1985 | Townsend | 452/127 |
| 4,649,605 A * | 3/1987 | Neal | 19/106 R |
| 4,700,447 A * | 10/1987 | Spann | 29/418 |
| 4,793,026 A * | 12/1988 | Braeger et al. | 452/127 |
| 4,941,379 A | 7/1990 | Gasbarro | |
| 5,021,023 A * | 6/1991 | Braeger | 452/127 |
| 5,211,097 A * | 5/1993 | Grasselli | 83/698.11 |
| 5,558,573 A * | 9/1996 | Basile et al. | 452/127 |
| 5,569,070 A | 10/1996 | Smith | |
| 5,688,538 A * | 11/1997 | Barr et al. | 425/299 |
| 6,383,068 B1 | 5/2002 | Tollett et al. | |
| 6,467,386 B1 * | 10/2002 | Denney | 83/874 |
| 6,668,698 B1 * | 12/2003 | Denney | 83/874 |
| 2003/0148726 A1 | 8/2003 | Smith | |
| 2004/0152407 A1 | 8/2004 | Smith | |

* cited by examiner

*Primary Examiner*—Thomas Price
(74) *Attorney, Agent, or Firm*—Jason H. Foster; Kremblas, Foster, Phillips & Pollick

(57) ABSTRACT

An apparatus for producing portions severed from a poultry breast of controlled size and weight having a rotary mounted product holder including a generally cylindrical outer surface provided with at least one product cavity for receiving a first portion of a poultry breast for travel along an arcuate path defined by the outer surface of the product holder. A pressing means including an arcuate surface selected to generally mate with a portion of the arcuate path of travel of said cavity is mounted a selected distance from the path of travel of said cavity for engaging the portion of poultry breast to urge and hold the first portion into the cavity. A cutting member is disposed generally tangentially relative to the path of travel of the cavity between the surface of the pressing means and the outer surface of the product holder to engage the poultry breast and separate the first portion of said poultry breast contained in the cavity from the remaining portion thereof.

3 Claims, 11 Drawing Sheets

POULTRY BREAST PORTION SIZING APPARATUS

CROSS-REFERENCES TO RELATED APPLICATIONS

This application claims the benifit of U.S. Provisional Application No. 60/623,604 filed Oct. 29, 2004.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to an apparatus and method for making proportioned food items, particularly meat, more particularly, the present invention relates to an improved apparatus and method for creating poultry breast fillet portions of a selected shape and weight.

2. Description of the Related Art

The food industry has a high demand for a highly uniform meat and poultry fillet portions, and particularly for poultry breast portions. This demand initially was done by manual cutting to attempt to prepare precise sizes and shapes of poultry breast fillets.

However, in addition to being labor-intensive, the individual skill of the hand trimmer led to products less uniform than was desired and at an inconsistent production volume.

Other prior art attempts to address this demand are disclosed in prior U.S. Pat. Nos. 4,941,379; 5,569,070; and 6,383,068 B1.

It should be noted that a whole chicken breast fillet is often referred to in the industry as a whole butterfly and comprises the muscle meat of a chicken breast which includes the thicker breast and shoulder forward portion which tapers rearwardly to the thinner tail portion and laterally to the rib meat. The outer portions of the rib meat is most often not included in the controlled breast portions of higher market value. The thicker breast and shoulder portion is generally about twice the thickness of the tail portion, particularly in those poultry breast whole butterfly cuts weighing nearly a pound or more.

The first two mentioned patents offered as an improvement over hand trimming the controlled portion from poultry breast meat, however, each exhibited some drawbacks which some in the industry deemed as less than fully satisfactory.

U.S. Pat. No. 6,383,068 B1 provided another form of apparatus for producing poultry breast portions from a whole poultry breast butterfly which some skilled in the art believe represents a significant improvement relative to the uniformity of the size and shape of the breast fillets produced.

However, this latter patent discloses an apparatus which is relatively complex in construction and large in size and requires significant plant space. The construction also requires a degree of maintenance considered to be higher than desired. Further, while the size and shape of the controlled portions of breast fillets produced are generally satisfactorily uniform, the remaining trim portion of the poultry breast from which the controlled portions are cut are of a size and shape which cannot be fully utilized for sale at as high a price as desirable. When one considers that the uniform controlled breast portions or fillet portions currently highly sought by the industry from a single whole poultry breast typically weigh between about 70 to 92 grams or about 3 to 3.5 ounces and the whole breast meat butterfly weighs between about 14 to 24 ounces, this leftover trim portion represents a significant amount of the total available breast meat product.

Heretofore, the shape and condition of this leftover trim portion has been hand trimmed to attempt to produce an additional piece of poultry breast of uniform weight, size and shape which has a higher market value. However, such attempts have been less than satisfactory and often a very significant portion of the leftover trim must be sold at a price considerably less than that for a controlled, more uniform piece of breast meat having a shape suitable for sale as a fillet or cutlet portion. The loss of value represented by the difference between the market price of a well-proportioned, uniform portion of poultry breast and the current leftover trim portion produced by prior machines may be as high as 75 cents per pound or greater.

Such a price difference represents a loss of millions of dollars for a high volume producer of controlled portions of poultry breast on an annual basis. The prior attempts to solve this problem with a less complex, efficient apparatus having low maintenance and providing improved results have been less than satisfactory prior to the present invention.

BRIEF SUMMARY OF THE INVENTION

The present invention provides an apparatus and method for producing controlled portions of poultry breast meat which are highly uniform in shape and weight, as well as in other desirable characteristics, in a manner wherein the remaining trim portion of the poultry breast is of a shape and size enabling one to obtain additional high quality portions of breast meat from the trim portion compared to prior proportioning machines. This trim portion of higher value represents a dramatic increase in profitability to the processor.

In one aspect of the present invention, the proportioning apparatus of the present invention provides a generally cylindrical product holder provided with peripherally-spaced cavities, each for receiving a portion of whole breast fillet. The cavities are preferably arranged in side by side pairs spaced from one another along the circumference of the outer surface of the cylindrical product holder. Means are provided to cause rotation of the cylindrical product holder to move the cavities along an arcuate path and into engagement with a pressing means which assures part of the breast portion appropriately fills the cavity while the breast portion is being held in the cavity, it passes a cutting station wherein the breast portion is separated into a highly uniform breast fillet and a piece of trim meat having a shape and size capable of yielding an additional uniform breast fillet of high market value.

In the preferred embodiment, a pair of side-by-side cavities are disposed in spaced relationship from adjacent pairs of cavities such that a whole poultry breast or butterfly may be loaded into the side-by-side cavities and subjected to a horizontal cutting means to produce two uniform poultry breast meat portions conforming to the cavity and two trim pieces. The whole breast may be divided by a vertically disposed cutting means disposed to engage the poultry breast along its centerline longitudinal to its path of travel either prior to or subsequent to the horizontal cutting means.

In one aspect of the present invention, the pressing means may be in the form of an arcuate shoe or plate spaced above the cylindrical product holder and cavities a predetermined distance to force the breast portion downwardly toward the cavities and holding the breast in a fixed position during the cutting action.

It is another aspect of the present invention to provide an apparatus of the type described wherein the cavities for receiving a portion of the whole breast are of a particular size and shape such that the breast portion is received in a disposition not only designed to produce a uniform breast fillet in the cavity but importantly, a piece of trim meat having a more uniform and desirable shape and size wherein an additional high quality breast fillet may be produced having a market value at or near the market price for the portions produced in the cavities.

It is therefore an object of the present invention to provide an improved apparatus and method for producing uniform fillets from whole poultry breasts in a manner increasing the market value of the whole breast being processed compared to prior methods and means. It is a further object to obtain more effective product value as noted above using a compact, space-saving and efficient apparatus which requires less maintenance relative to prior art apparatus used for the proportioning whole poultry breasts.

Figure 1:
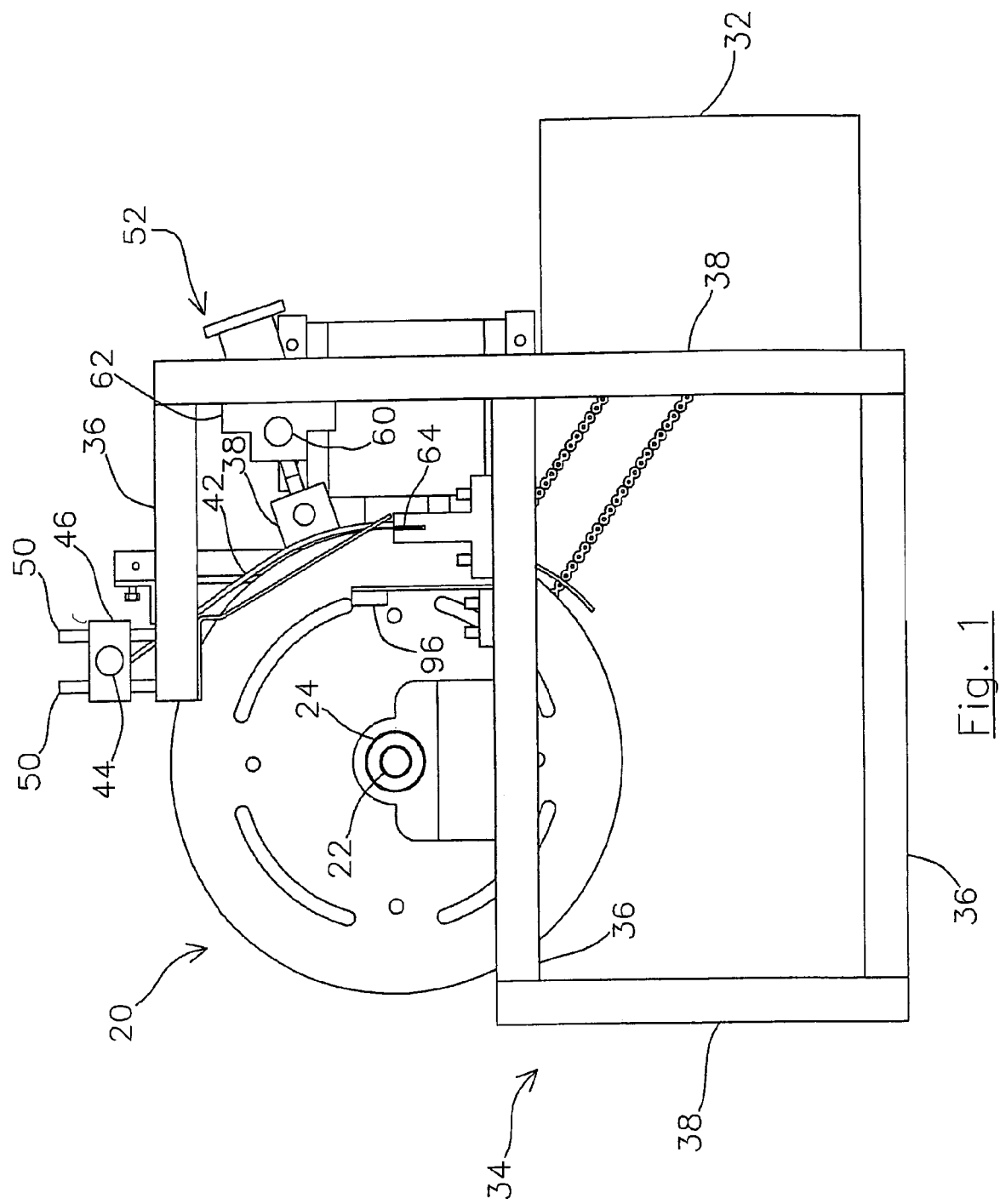
FIG. 1 is a side view of an apparatus to produce controlled portions of poultry breast meat constructed in accordance with the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 2:
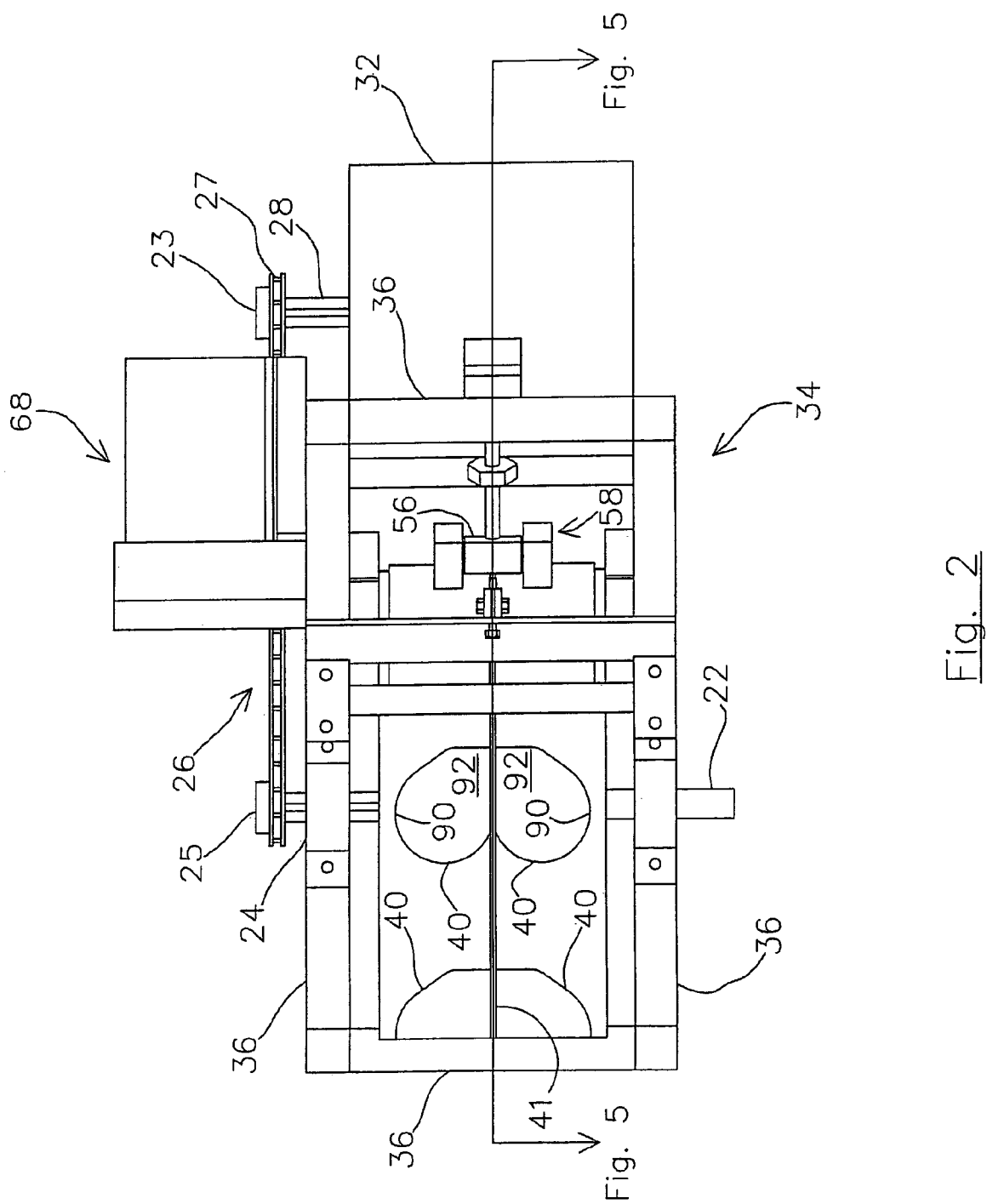
FIG. 2 is a top plan view of the apparatus shown in FIG. 1.
Figure 3:
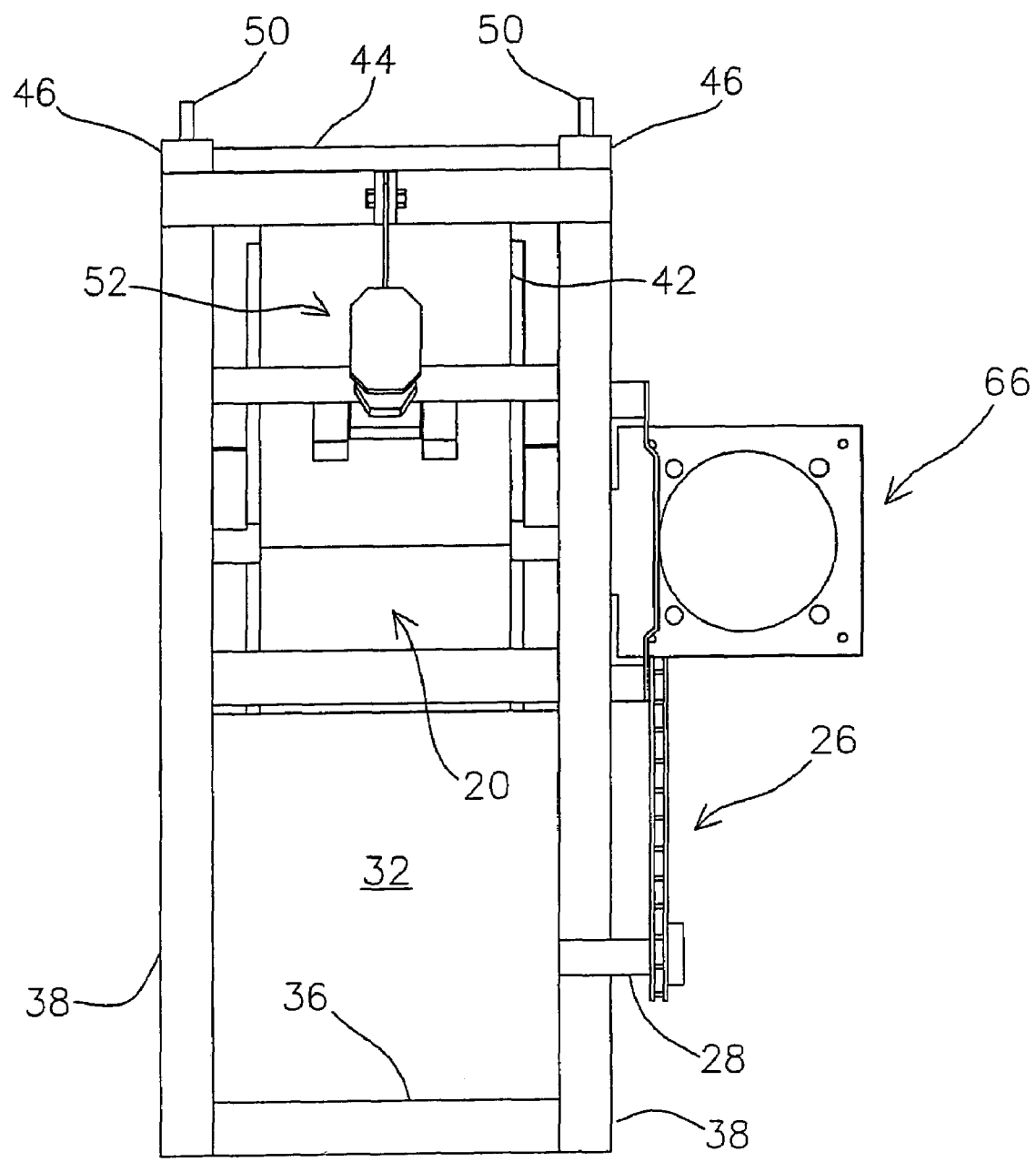
FIG. 3 is a right end view of the apparatus shown in FIG. 1.

An apparatus for proportioning plural pieces from a meat product such as a whole muscle poultry breast fillet is shown in FIGS. 1–3 and constructed in accordance with the present invention. The apparatus comprises a generally cylindrical shaped product holder, indicated generally at 20 which is mounted to a shaft 22. Shaft 22 is rotatably mounted at each end to bearing members 24 such that product holder 20 may be rotated in a controlled manner. This cylindrical shape provides significant space-saving in an automated production facility which always is of great value.

One end of shaft 22 is operatively connected to a conventional sprocket and chain assembly indicated at 26, which includes sprockets 23 and 25 and chain 27, and operatively connects drive shaft 28 of a conventional electric motor, not shown, mounted within a motor housing 32 to shaft 22. Motor housing 32 may be conventionally mounted in any suitable manner to a support frame, indicated generally at 34. Support frame 34 includes horizontal and vertical frame members, such as 36 and 38 welded together to provide suitable support for the other components. The conventional electric motor within housing 32 provides a controlled speed of rotation to shaft 22 to control the speed of rotation of product holder 20. The preferred speed of rotation is selected in relationship to the ability to manually load a whole poultry breast meat product into the product receiving cavities, such as 40, as efficiently as feasible to maximize output. Cavities 40 are preferably formed in the arcuate outer surface of cylindrical product holder 20 to create a meat portion of closely controlled weight and shape as described in detail later herein. Cavities 40 may be formed in any suitable conventional manner, including machining or molding of a product holder such as 20 with cavities formed therein. Cylindrical product holder 20 preferably comprises a suitable plastic material, such as delrin, for example, or any other material suitable to meet the applicable government regulations for processing food products.

A compression or pressing member preferably is in the form of a shoe-like plate 42 fixed to a shaft 44 which is rotatably mounted within conventional bearing blocks 46 and extends downwardly along an arcuate segment of the path of travel of product holder 20 at a variable spaced distance from the outer surface of product holder 20. Bearing blocks 46 may be mounted to a horizontal support frame member 36 in any conventional manner, such as via a pair of post members or threaded studs 50 attached to a frame member 36.

The movement of plate 42 about the axis formed by shaft 44 is controlled by a cylinder and piston arrangement, indicated generally at 52 which includes an air cylinder 54, a piston rod 56 and contact shoe 58. Shoe 58 is pivotably mounted to the end of piston rod 56 and fixed to plate 42 as best seen in FIGS. 1 and 2. Cylinder 54 is pivotably mounted to support frame via a pivot rod 60 rotatably mounted in bearing blocks 62 in a conventional manner to allow piston 56 to apply a linear force through shoe 58 to the lower portion of plate 42 toward and away from the surface of product holder 20.

Cylinder and piston assembly 52 preferably includes conventional controls to apply a constant, but adjustable amount of force applied to plate 42 and therefore the force applied to a poultry meat product disposed in cavities 40 as they pass along the path underlying plate 42.

It should be noted that other conventional arrangements may be usefully employed which function to apply a controlled bias force against plate 42 toward and away from the surface of product holder 20 and upon a meat product disposed overlying cavities 40 for the purposes of the present invention. It should be noted that the level of force applied to the poultry breast during the cutting action at generally a right angle to the path of travel of the cavity 40, may be used to adjust the weight yield of product produced within a cavity 40 within one to two percent by weight. The force applied should be sufficient to securely hold the breast meat product in a constant position during the pressing and cutting step to assure a uniform end product.

A cutting blade 64 is disposed under or closely adjacent to the terminal end of plate 42 in a tangential relationship to the arcuate surface of product holder 20 to cut the breast meat product disposed within cavities 40 along a line closely following the arcuate surface of product holder 20 to horizontally separate the meat portion within each cavity from the remaining meat portion disposed outside the cavity. The latter meat portion is typically referred to in the industry as the trim meat. Prior to the present invention, this trim meat has been produced in a shape and condition which substantially reduced the market value of most of the trim meat portion compared to the controlled breast fillet portion produced within the cavity.

Cutting blade 64 is operatively mounted for reciprocation in connection with a cutting arrangement indicated generally at 66.

Figure 10:
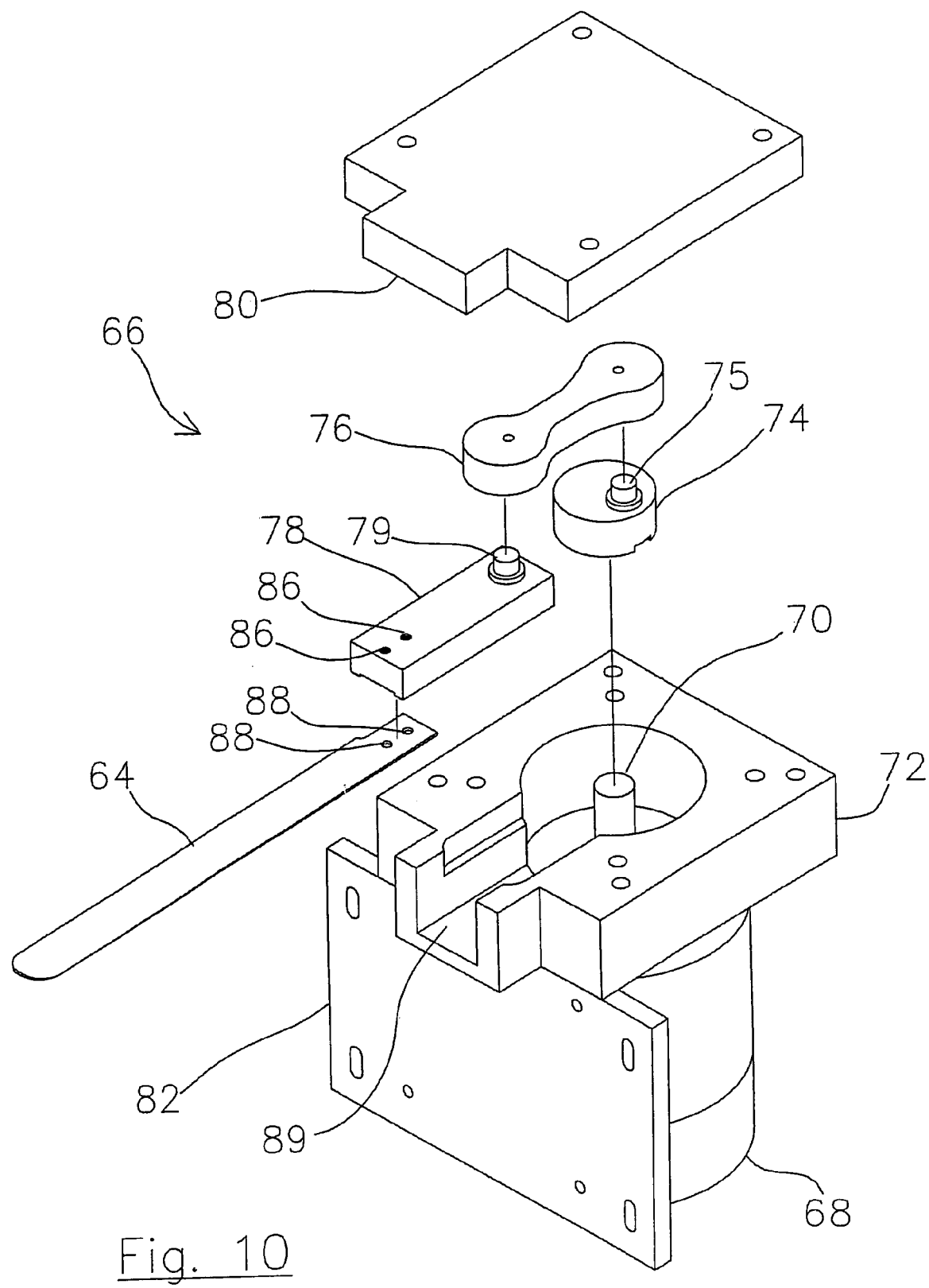
FIG. 10 is an exploded view of a preferred knife assembly to support and drive the cutting means disposed to separate the breast portion within the cavity from the remainder of that portion extending above the cavity.

As best seen in FIG. 10, cutting arrangement 66 includes a conventional electric motor 68 having a driving shaft 70 extending into crank housing block 72 and is connected in an off-center manner to a crank disc 74. A peg 75 is fixed to and extends upwardly from disc 74 in a first bearing hole 84 providing a connecting arm 76. The opposing end of connecting arm 76 includes a second bearing hole which receives an upstanding peg 79 provided on a knife holder 78.

Cutting blade 64 is fixed at one end in any conventional manner to knife holder 78 via suitable fasteners, not shown, via aligned holes, such as 86 and 88.

Housing block 72 includes a guide passage 89 which closely receives a knife holder 78 in a laterally confined manner. The eccentric motion created by the rotation of crank disc 74 is thus converted into a linear reciprocal motion imparted to blade 64.

It should be noted that other suitable conventional cutting arrangements may be employed, such as a band saw for example, to accomplish the equivalent cutting function performed by blade 64 without departing from the spirit of the present invention.

A cover plate 80 is bolted over housing block 72 and a mounting plate 82 is fixed to electric motor 68 for convenient attachment of the cutting arrangement 66 to the support frame in any suitable conventional manner, such as bolts or the like, not shown.

With reference to FIGS. 2, 4–7 and 11, the sequence of loading a whole poultry breast fillet or butterfly, as some refer to it in the industry, will be described in connection with a description of the configuration of the cavities 40 in connection with the operation of the apparatus of the present invention.

Figure 11:
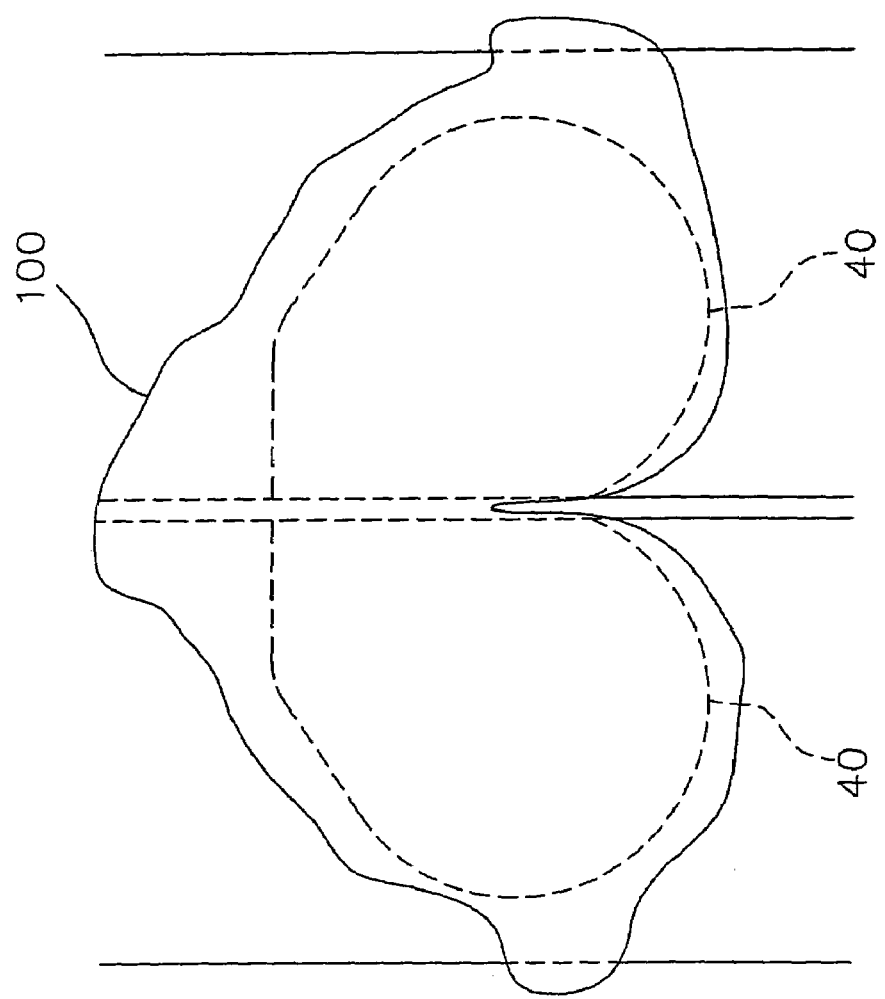
FIG. 11 is a partial top view of a portion of the embodiment of the present invention shown in the preceding Figures diagrammatically illustrating the preferred loading arrangement of a whole breast portion over a pair of cavities.

A single operator located to the left end of the apparatus, as seen in FIG. 2, loads a whole breast butterfly 100 over and partially into the side-by-side cavities 40 as diagrammatically shown in FIG. 11. A longitudinal slot 41 is provided in the surface of product holder 20 between the preferred arrangement of side-by-side cavities 40, each of which are preferably of the same size and configuration which meets the needs of the processor's ultimate customer to produce the closely controlled fillet product produced within cavity 40. In the preferred embodiment a vertically extending knife 43 is fixedly mounted on frame 38 in any conventional manner and extends downwardly through a slot, not shown, in pressing member 42 a distance sufficient to extend in slot 41 extending around product holder 20 and between side-by-side cavities 40. As a whole breast properly loaded over a pair of cavities 40 as described herein moves under pressing member 42, the whole breast is cut longitudinally into halves by engagement with knife 43. However, it should be noted that the whole butterfly breast could be longitudinally split in half and a single line of spaced cavities could be employed if desired with a halved portion of the whole breast placed over a cavity.

It should be pointed out that a whole poultry breast meat has a configuration wherein the forward breast portion on each side adjacent the wing attachment is the thickest part of the breast. The breast tapers to a thinner meat portion toward the tail end of the breast portion and toward the end of the rib area of the poultry body, as is well known in the industry. Therefore, the thicker forward end of the breast is the more desirable portion to include a portion controlled piece of breast fillet, the remainder often being referred to as trim portion in the industry.

While the length, depth and thickness of the poultry breast may vary relative to original size, the particular choice of shape and weight of a controlled fillet portion will vary according to the ultimate customer. In the more preferred embodiment of the present invention, the relationship of the boundary or side walls 90 to the bottom wall 92 of the cavity, has an important effect in the consistency of the shape and weight of the controlled portion of meat produced within the cavity. However, it has been found that this fact also tends to control the shape and condition of the remaining trim portion.

With respect to the boundary walls 90 of the cavity, a radial line drawn relative to the axis of rotation of product holder 20 through a point where the boundary walls 90 intersect the arcuate upper surface of the product holder 20 and a point where the boundary walls 90 intersect the general contour of the bottom wall of the cavity, preferably forms an angle of approximately 90 degrees. However, this angle may vary between approximately 85 to 95 degrees and still produce a very desirable end product.

Figure 12:
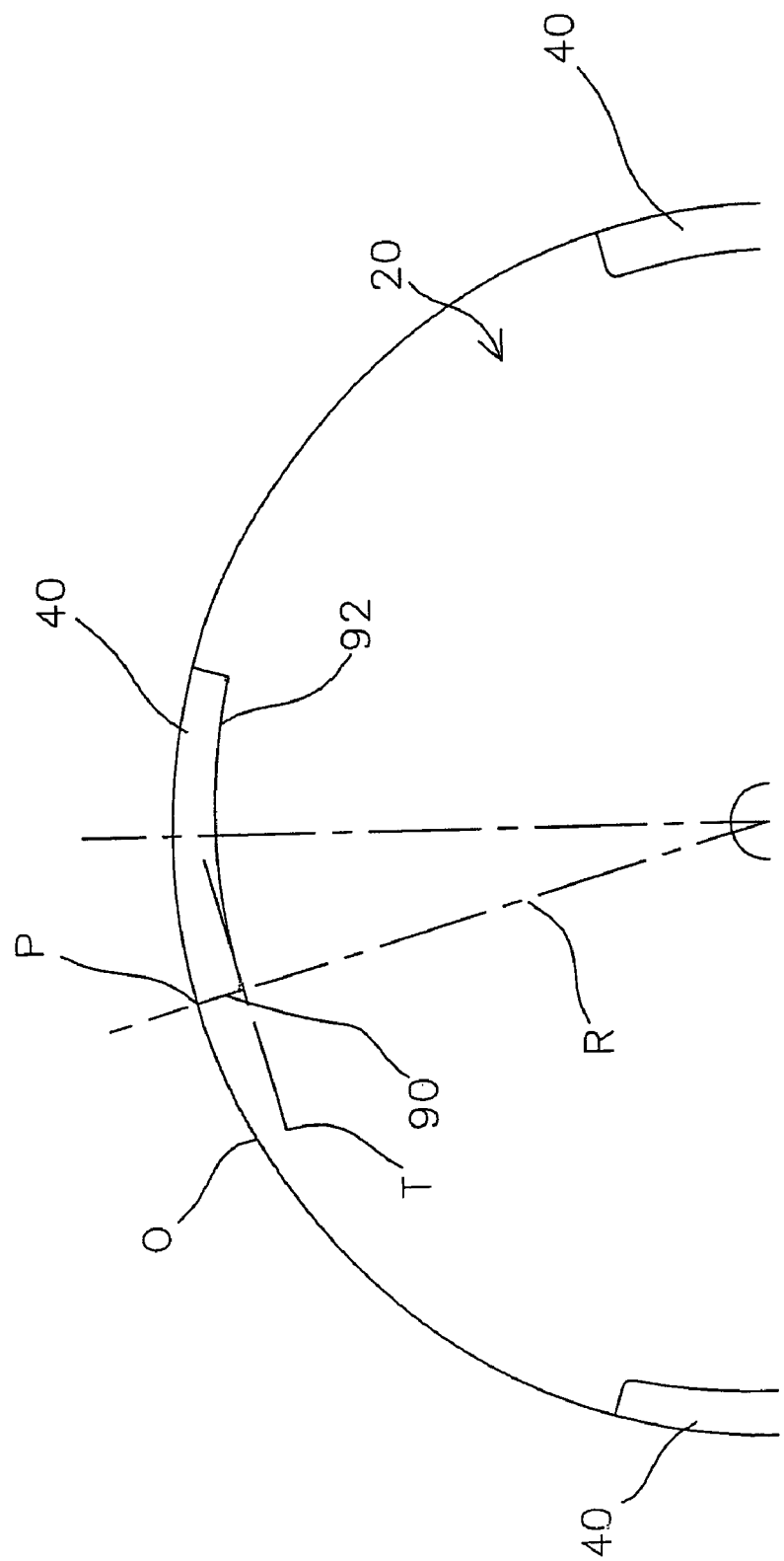
FIG. 12 is a partial side elevational view of the product holder shown in the preferred embodiment diagrammatically illustrating the preferred angular relationship between the boundary and bottom walls of the cavities employed in the apparatus shown in the preceding Figures.

This preferred angular relationship is diagrammatically illustrated in FIG. 12. Radial line R is drawn through a point P which represents a point of the intersection of boundary walls 90 with the outer surface O of product holder 20. In accordance with the preferred embodiment shown, bottom wall 92 of a cavity 40 is arcuate, however dependent upon the size of the diameter of product holder 20, bottom wall 92 may be or closely approach a straight line and still provide a satisfactory tapered depth to cavity 40 and still provide the more desirable tapered configuration to the controlled portion produced within a cavity 40.

Assuming bottom wall 92 is arcuate as shown, a line T tangent to the arcuate surface of bottom wall 92 at the point of intersection with line R forms an angle close to 90 degrees within about plus or minus 5 degrees.

The intersection of the boundary walls and bottom walls of a cavity 40 may be modified by a small radius for purposes of ease of manufacture and to reduce any sharp angles along the edge of the bottom walls to enhance a more consistent volume of meat product. A radius of between about one-sixteenth to one-quarter of an inch appears to work well in this respect. However, relative to the angle defined above, such a radius may be ignored with the bottom surface being extended to the radial line as noted.

This relationship between the boundary walls and the bottom wall is particularly important toward approximately about the rearward half portion of the cavities 40. This angular relationship forms a restraint particularly against any significant rearwardly directed movement or dislodgment of the portion of the poultry breast from within the cavity during the pressing and subsequent cutting step after proper initial loading of the whole breast butterfly in the intended disposition relative to the cavities 40. Therefore the location of the breast portion within the cavity is maintained very closely during the pressing and cutting steps.

It has been discovered that the unique natural shape of the whole butterfly breast meat is best utilized in the configuration of the present invention by loading the thicker forward portion of the breast toward the rear of cavities, such as 40, with the thinner tail end disposed, at least partly, within the forward end.

In the preferred embodiment shown, the bottom wall of the cavities 40 is provided with an arcuate contour deeper at the rearward end relative to the forward end. The arcuate bottom wall may be produced having a radius of curvature generally equal to the outer surface of product holder 20 with the center offset to provide the gradual taper as illustrated in the drawings primarily as an effect of the milling process used to create cavity 40.

This preferred tapered relationship allows for the controlled fillet cut matching the cavity to include a significant amount obtained from the thicker breast and shoulder area with a general pleasing tapered appearance toward the thinner portion of the product contained in the forward portion of the cavity. However, very importantly, it also provides a very significant portion of the thicker breast portion to be included in the remaining trim portion, which upon separation from the portion in the cavity, appears to be cut in a straight line along one surface to produce a well-proportioned piece of breast meat having a pleasing esthetic appearance and which may be utilized as an additional piece of high market value breast fillet. Relatively minor hand trimming of the thinner edge portions provides a very desirable piece of breast fillet of high market value.

It is important to point out that the consistency of the size and shape of the portion produced within the cavity and the remaining trim portion is assured by the angular relationship between the boundary walls and the bottom wall as noted earlier herein. It is further enhanced by the constant pressure applied by the pressing means upon the breast meat overlying the cavity during the cutting action over the arcuate path. Since the angle between these walls as described restrains movement of the breast portion within the cavity and essentially traps the thicker breast portion against the rearward and medial boundary walls during the subsequent rotation under the pressing member 42, the breast meat portion urged into and held in the cavity 40 during the cutting step remains highly consistent in shape and size. As a result, this consistent location of the meat also assures similar proportional consistency with respect to the remaining trim portion and produces a trim portion which possesses higher market value than prior methods and means.

If the boundary walls of cavity 40, particularly toward the rearward portion of the cavities 40, are inclined rearwardly greater than about 95 degrees or so, the forces applied to the breast butterfly portion during rotation under pressing plate member 42 and the cutting action of blade 64 tend to allow rearward movement of the thicker breast portion out of the cavity. In this event, the shape of the trim is adversely affected even if the portion produced within the cavity is still marketable at the desired higher price. Therefore, the positive placement and locking in of the whole breast butterfly within the cavity as described herein contributes to one of the valuable features of the present invention relating to producing a trim portion allowing capture of a significantly greater market value from the whole breast butterfly compared to prior poultry breast proportioning apparatus.

Figure 4:
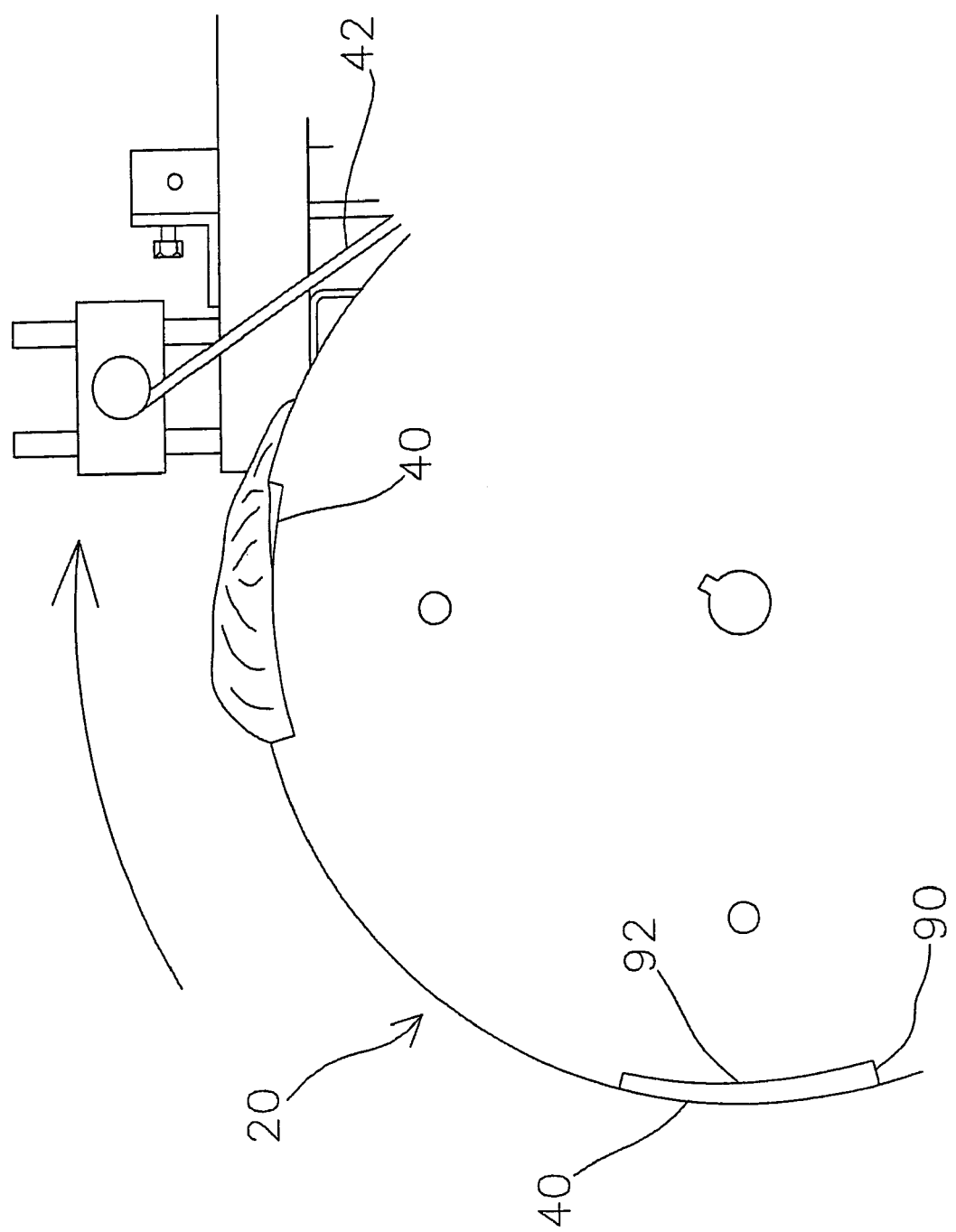
FIG. 4 is a partial side view showing only a portion of the cylindrical conveyor and the cavities for holding the whole poultry breast in an initially loaded position.

In the preferred manner of practicing the present invention, the whole butterfly breast is placed over a pair of side by side cavities 40 with the centerline of the butterfly between the cavities and the thicker breast portion 70 located within the rearward boundary walls of the cavities as diagrammatically shown in FIG. 4. Typically, a relatively small portion of the thinnest tail end portion may rest outward of the forward end of each cavity 40 and the outer portion of the rib meat may also extend outside a medial portion of each cavity 40 as shown diagrammatically in FIG. 11.

As earlier described herein, the rearward portion of the boundary walls of each cavity function as a locating means in a positive and repeatable manner initially with respect to manually loading the butterfly relative to the cavity and subsequently during the pressing and cutting actions which occur.

In the cavities as described herein, one loads the whole butterfly, preferably breast skin side down toward the bottom of the cavities 40 with the thicker forward breast portion facing rearward relative to the arcuate path of travel defined by rotation of product holder 20 as illustrated in FIG. 4. This thicker forward end should be positioned against the rearward portion of the boundary walls 90 wherein no part of the lower half of this portion extends outside cavity 40.

Product holder 20, in the preferred embodiment shown, is provided with arcuate grooves 94, spaced circumferentially in relationship to the spacing of each pair of cavities 40 provided in product holder 20.

Figure 5:
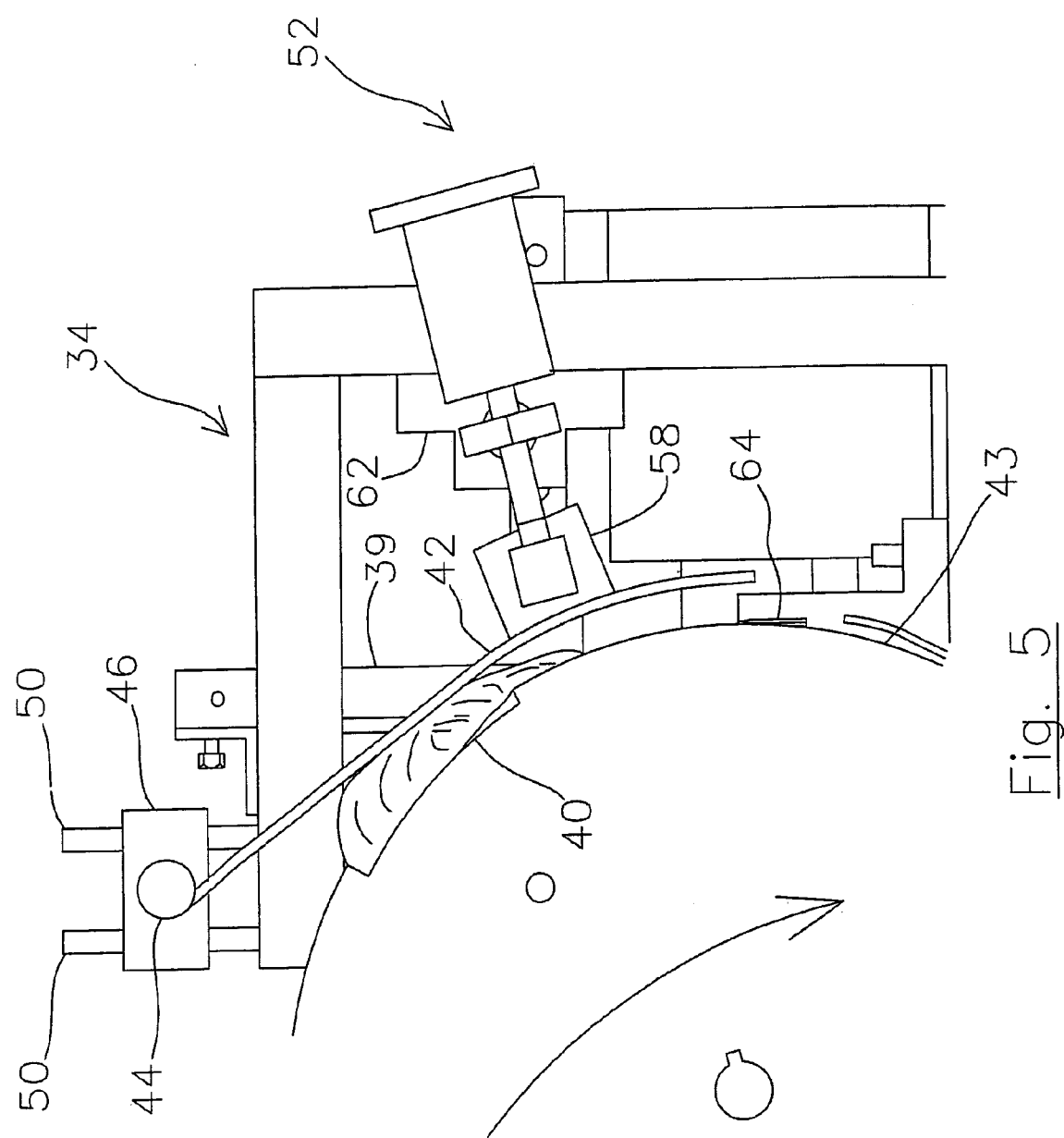
FIG. 5 is a partial side view of a portion of the apparatus shown in FIG. 1 showing the cavities passing under a controlled pressing and holding means adapted to seat the breast portion in the cavity prior to and during a vertical cut along the path of travel to separate the whole breast into essentially equal half portions.

A cam follower, in any conventional form such as a roller arm for example, is operatively mounted on a frame member 36 and aligned to engage each groove 94 as product holder 20 is rotated. The follower is operatively connected to an actuator 96 operatively connected to air cylinder 52. When the cam follower drops into a groove 94, actuator 96 moves to signal air cylinder 52 to extend piston rod 56. Extension of piston rod 56 moves pressing plate member 42 toward the outer surface of product holder 42. The timing of the cam arrangement is coordinated to move pressing member 42 into engagement with the butterfly breast loaded into cavities 40 as the cavities pass under pressing member 42 as seen in FIG. 5 and before the cavities reach cutting blade 64. As earlier described herein, piston and cylinder arrangement 52 includes conventional controls allowing a selected constant force to be applied to member 42 and hence the poultry breast portion passing under member 42. The constant force selected to be applied by cylinder and piston arrangement 52 can be adjusted to vary the weight of the portion contained within cavities 40 within about 1 to 5 grams based upon a target end product weight of about 90 grams for a given design volume for cavity 40. This degree of control of the weight of the meat product produced within cavities 40 is deemed very desirable by the processor using such proportioning apparatus.

Just prior to the breast meat portion exiting from under pressing member 42, it is engaged by cutting blade 64 aligned tangentially very close to the outer surface of product holder 20 to sever the portion within cavities 40 from the trim portion outside the cavities.

Figure 6:
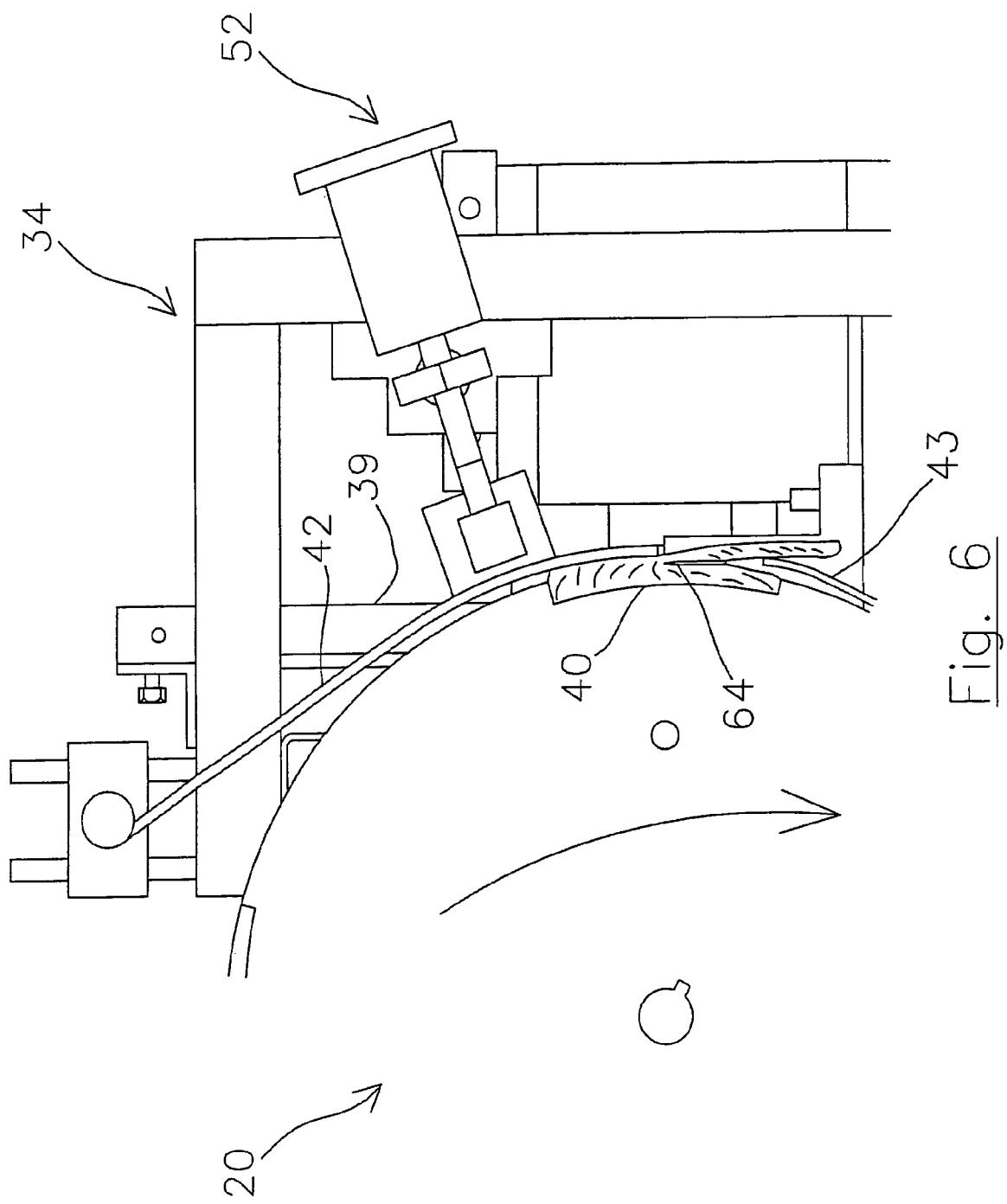
FIG. 6 is a partial side view similar to the views in FIGS. 5 and 6 showing the further progression of the cavities under the pressing and holding means and into contact with a laterally disposed cutting means disposed tangentially to the arcuate surface of the cylindrical conveying means to separate the breast portion contained within a cavity from the portion extending above the cavity.
Figure 7:
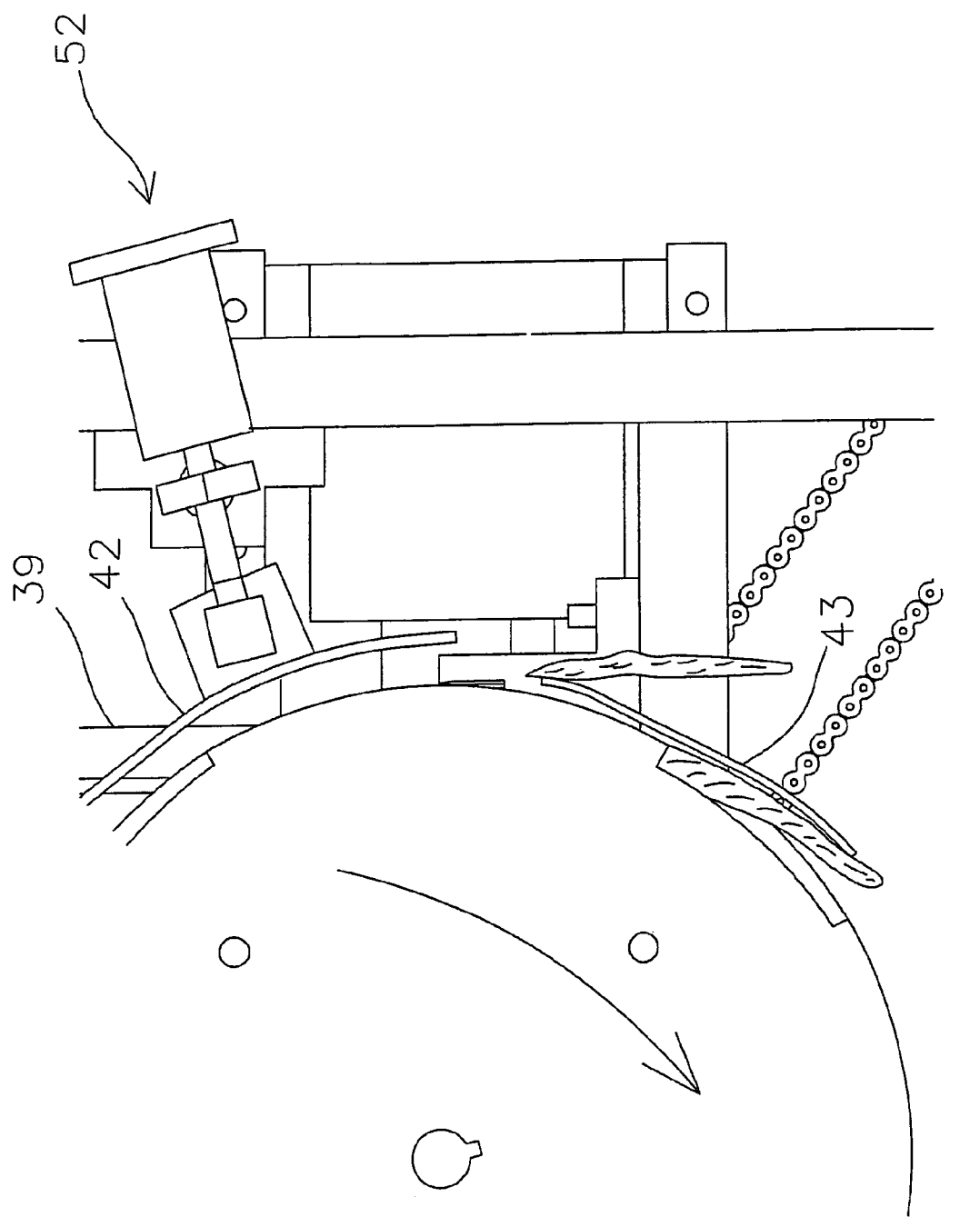
FIG. 7 is a partial side view similar to the views of FIGS. 5 and 6 showing the further progression of the cavities wherein the breast portions cut within the cavities and the remaining trim portions are directed to different collection sites for further handling.
Figure 9:
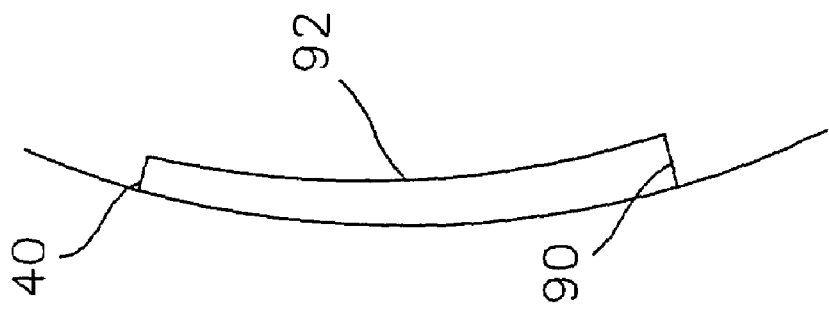
FIG. 9 is a top view of one pair of the side-by-side cavities seen in FIG. 2.
Figure 8:
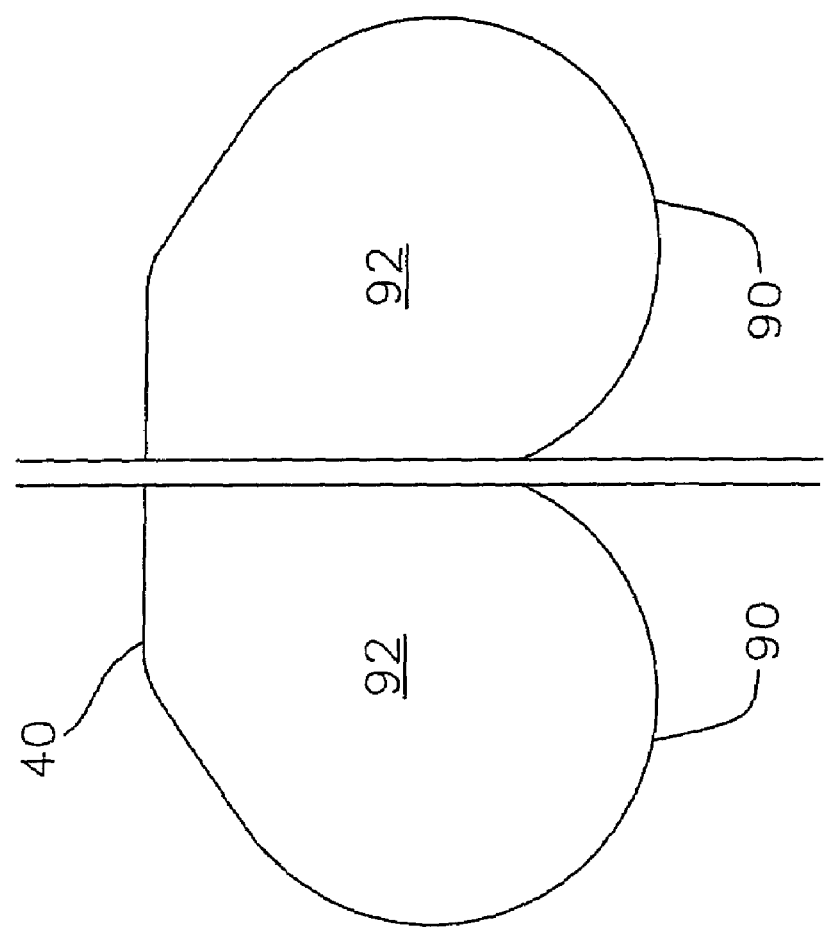
FIG. 8 is a side view illustrating a single cavity formed in the cylindrical conveying means showing a preferred configuration which contributes to providing both a uniform portion within the cavity and trim portion having a relatively highly desirable shape.

As best seen in FIGS. 6 and 7, cavities 40 continue to rotate after cutting has occurred and a separation plate 43 guides the trim portion toward a collection area and the controlled weight portion within the cavities 40 is free to fall out of the cavities to a different collection area upon retraction of pressing member 42. Each collection area may be in the form of a suitable belt conveyor to transfer the cavity controlled portion and trim portion to appropriate areas for subsequent handling.

Separation plate 43 may be suitably fixed to frame members in any conventional manner. After the cutting action is complete, product holder 20 has rotated to a point where the cam arrangement reaches the end of a slot 90 and cam follower actuates the piston and cylinder arrangement 52 to retract pressing member 42. This allows the separated portions of meat to fall free into the different collection areas.

While certain preferred embodiments of the present invention have been disclosed in detail, it is to be understood that various modifications may be adopted without departing from the spirit of the invention or scope of the following claims.

The invention claimed is:

1. An apparatus for producing selected portions from a piece of poultry breast meat comprising, in combination;
   a) a rotatably mounted product holder having a generally cylindrical outer surface provided with a plurality of pairs of laterally spaced cavities, each pair being spaced circumferentially about the outer surface of said product holder, each of said cavities in a pair being configured to receive a laterally spaced first portion of a whole poultry breast for travel along a path defined by the outer surface of said product holder;
   b) pressing means including an arcuate surface spaced a selected distance from the outer surface of the product holder along a portion of the path of travel of said at least one cavity to engage said poultry breast and urge and hold said first portion into said cavity;
   c) first cutting means disposed generally tangentially to the path of travel of said at least one cavity between said surface of said pressing means and the outer surface of said product holder to engage said breast meat and separate the first portion of said poultry breast contained in said cavity from a remaining portion of said poultry breast outside said cavity;
   d) said at least one cavity having an arcuate bottom wall and boundary walls vertically extending from said bottom wall configured to inhibit movement of the rearward portion of a piece of poultry breast located within said cavity rearwardly relative to the path or travel of said at least one cavity upon engagement with said pressing means;
   e) a slot circumferentially disposed in said outer surface of said product holder between each of said pairs of cavities; and
   f) second cutting means aligned to penetrate within said slot to vertically engage and separate a whole poultry breast disposed in a pair of cavities into similarly shaped substantially half portions.

2. The apparatus defined in accordance with claim 1 wherein one end of said pressing means is mounted for rotation on a frame means and including an actuator connected to said pressing means to effect rotation of the arcuate surface of said pressing means between a first position and a second position, said first position spaced closer to said outer surface of said product holder relative to said second position.

3. The apparatus in accordance with claim 1 wherein a radial line from the axis of rotation of said product holder extending through a point where the boundary walls of a rearward portion of said at least one cavity intersect the arcuate upper surface of the product holder and through a point wherein the boundary walls intersect a line tangent to the general contour of the bottom wall at the point of intersection between the boundary wall and the bottom wall forms an angle with said tangent line between about 85 to 95 degrees.

* * * * *

UNITED STATES PATENT AND TRADEMARK OFFICE
CERTIFICATE OF CORRECTION

PATENT NO. : 7,204,748 B2
APPLICATION NO. : 11/255370
DATED : April 17, 2007
INVENTOR(S) : Geno N. Gasbarro It is certified that error appears in the above-identified patent and that said Letters Patent is hereby corrected as shown below:

Column 10, line 22, add --of--, delete "or"

Column 10, line 33, delete "defined"

Signed and Sealed this

Twelfth Day of June, 2007

JON W. DUDAS
*Director of the United States Patent and Trademark Office*